Sept. 24, 1957  J. F. BAYHI  2,807,793
CONTINUOUS REELABLE GEOPHONE
Filed Oct. 1, 1954  2 Sheets-Sheet 2

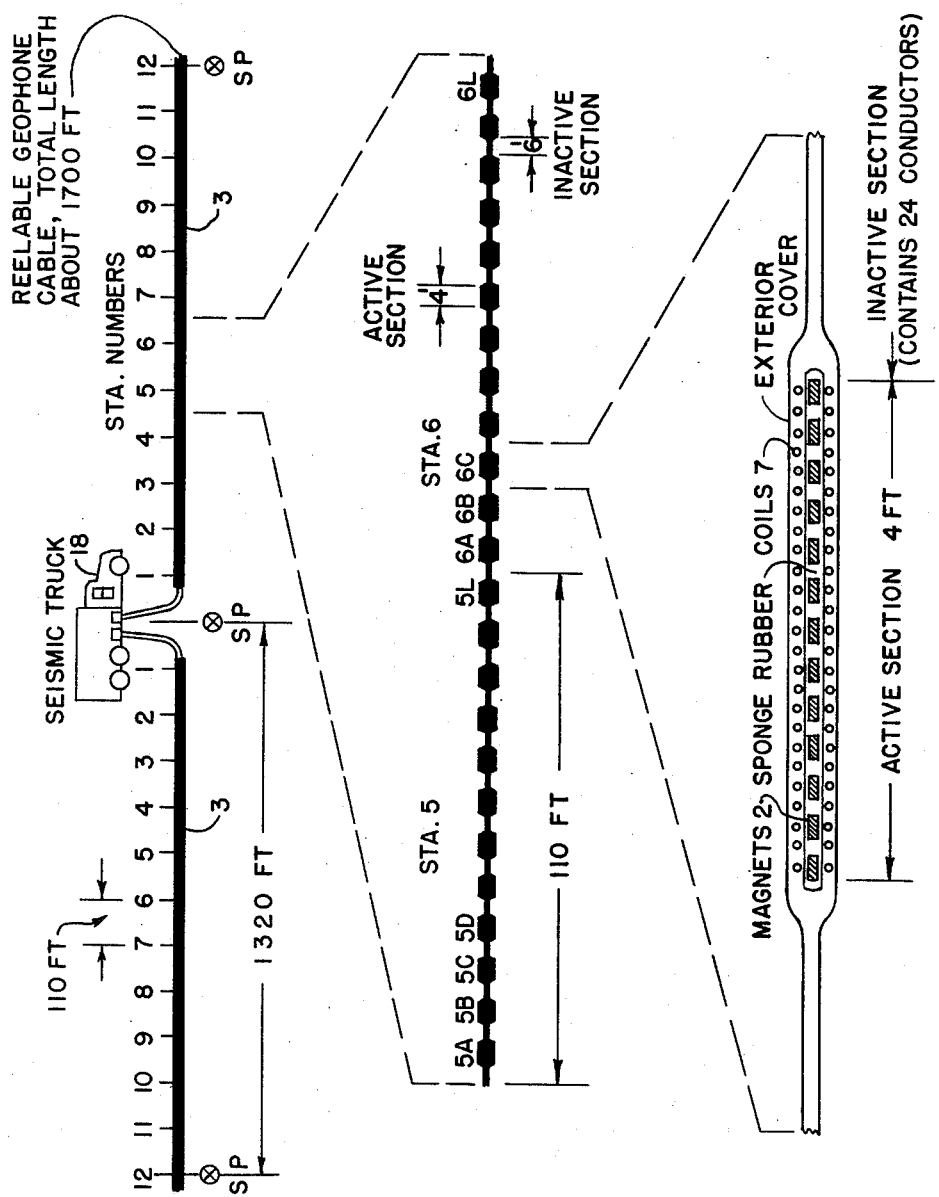

Joseph F. Bayhi Inventor

By  W. N. Wright
Attorney

United States Patent Office 2,807,793
Patented Sept. 24, 1957

2,807,793

CONTINUOUS REELABLE GEOPHONE

Joseph F. Bayhi, Tulsa, Okla., assignor to Esso Research and Engineering Company, a corporation of Delaware Application October 1, 1954, Serial No. 459,749

5 Claims. (Cl. 340—17)

This invention is concerned with an improved type of portable geophone or seismometer of the nature used in seismic prospecting. The invention is directed to a seismometer which is equivalent to an infinite number of conventional geophones distributed along a continuous cable. For this purpose, any desired number of relatively short permanent magnets are elastically suspended in the center of a flexible cable. Conductors, arranged as coils, are wrapped spirally around the cable within the sheath of the cable so as to form detecting coils responsive to seismic vibration of the magnets within the cable. The geophone arrangement of this invention is reelable in character so that in use the geophone cable can simply be spread along the ground in a manner greatly simplifying the operations involved in setting up geophone arrays.

A method commonly employed for prospecting for oil and other mineral deposits is that known as "seismic prospecting" wherein the depth and probable nature of underlying substrata are ascertained by initiating a seismic shock at or near the earth's surface. The resulting motion of the earth, due to seismic waves initiated by the seismic disturbance, are detected at a number of points at the earth's surface by means of sensitive pickups, known as geophones or seismometers. The geophones translate the detected wave motion into electrical impulses which can be recorded on a seismograph after suitable amplification. Usually the seismic disturbance is produced by detonation of an explosive shot placed on the ground, in a shot hole, or above the surface of the ground and adjacent thereto. It is common practice to place a considerable number of geophones in line with the shot point which are ordinarily spaced more or less evenly from each other and from the shot point. A suitable multiconductor cable is provided through which the individual geophones can be connected to a recording station, usually a field truck, provided with seismograph instruments. Conventionally, a seismograph record is obtained by means of a number of moving coil galvanometers, each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, suitably amplified, and fed to the galvanometers. The strip of paper or film is moved longitudinally at a substantially constant speed and is provided by well known means with suitable timing marks so that when the seismograph record or seismogram is later examined, it is possible to determine the length of time required for the arrival of seismic waves at any particular point on the earth's surface, either directly from the source or by reflection from underlying strata. From other data obtained in the area being studied, such as seismic wave velocities in the various earth layers, it is then possible to estimate the depths of the various reflecting substrata.

The making of seismograph records in the manner above referred to is of value in that it gives information regarding the nature of the earth's subsurface based on the principle that part of the energy of the artificial seismic shock will travel downwardly and be reflected back toward the surface, by various more or less well-defined substrata, and that this reflected energy will be detected by the geophones and will be recorded on the seismograph record. Hence, the desirability of placing on one record the traces of as many geophone locations as is practical, since a reflection from a well-defined substratum will appear on the record as a wave form of increased amplitude on all of the traces in some definite time relation, permitting the reflection to be "lined up" on the record.

In order to increase the effectiveness of the records, it has become frequent practice to employ a plurality of geophones at each station, all tied to one trace on the record. This practice has many advantages, including the cancelling out of near-surface anomalies. For example, if only a single geophone is used and it happens to be placed near a buried stump or boulder, an anomalous travel time may be obtained for seismic waves reaching that geophone, whereas if 30 or 50 geophones are laid out and all tied to the same trace, anomalous signals will be cancelled out and the reflected wave will be picked up by the majority of the geophones. Also, if a plurality of geophones are laid out in the direction of the line of spread of the geophone stations and several geophones are tied to the same trace, the group of geophones will act as a directional receiver since signals that are not lined up will tend to cancel out, whereas nearly plane wave fronts, representing reflections from substrata, will arrive at all of the geophones at substantially the same time. Furthermore, a plurality of geophones tied together in this manner will aid in discriminating against disturbing background noise, generally referred to as "wind noise" and "ground unrest"; thus resulting in improved presentation of the reflected signal. A further result will be that weaker reflected signals will be discernable, or conversely, smaller initiating explosive charges may be employed to give equal efficiency in detecting reflecting layers.

It is evident that although the use of a plurality of geophones at each station produces many advantages, the practice does add to the time and labor involved for the making of each record, as well as to the investment cost. It is accordingly one object of the present invention to provide a single geophone which will replace such a plurality of geophones at each station. Another object is to provide a single instrument which will in effect act as an infinite number of geophones placed side by side. It is a further object of the invention to provide a seismometer capable of picking up an integrated signal representative of a true reflected wave front of seismic energy and to reject or cancel out spurious signals.

It is an additional feature of this invention that the geophone is uniquely adapted for convenient use in connection with a conventional cable reeling truck. The geophone cable can simply be placed on the surface of the earth along any selected line for its positioning without necessity for particular hand placement of the type ordinarily required with conventional geophones. The flat or ribbon-like construction of the geophone ensures proper orientation of the geophone elements which is achieved simply by preventing twisting of the cable on the ground. It is convenient to differently color the two flat surfaces of the geophone so as to permit a visual check as to whether or not the geophone is in its proper position on the ground.

The attached drawings diagrammatically illustrate a preferred form of the present invention.

In the drawings:

Figure 1 diagrammatically illustrates the nature and method of employing the invention in which the uppermost portion of the drawing illustrates the arrangement of the cable along the ground with respect to a field truck and in which the lower portions of the drawing illustrate details of the arrangement in enlarged scale;

In the geophone construction of this invention, a large number of permanent magnets 2 are elastically suspended in a flat cable 3. The magnets are preferably constructed of one of the strongly magnetic alloys now known such as Alnico. The magnets are primarly selected to be relatively short relative to the longitudinal axis of the cable so that the flexibility of the cable will not be too seriously affected and the entire arrangement can be reeled in use. It is important that the air gap between successive magnets be short relative to the length of the magnets. This has the effect of restricting the magnetic lines of force to the region of the air gap. It is apparent that each of the magnets must be similarly oriented so that the north pole of one of the permanent magnet elements is adjacent to the south pole of the next adjacent magnet.

Figure 4:
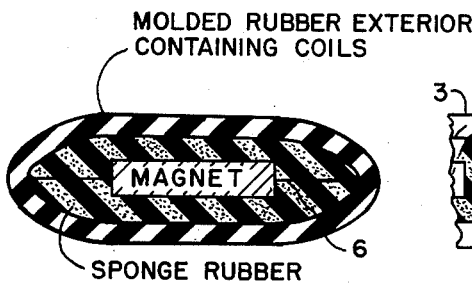
Figure 4 is a cross-sectional view of Figure 2 to more particularly illustrate the positioning of the permanent magnets within the cable.

In order to suitably elastically support the magnet elements in the cable, it is necessary to essentially imbed the magnets in a solid elastic medium. This is simply achieved by employing a material of the nature of sponge rubber which is essentially used completely about the magnets. Any desired type of fabrication may be used to achieve this, although it is convenient to employ molded sponge rubber elements 5 and 6 as shown in Figure 4. By forming the sponge rubber elements 5 and 6 in the the two segments illustrated, the magnets can simply be sandwiched between the two sponge rubber ribbons.

Figure 2:
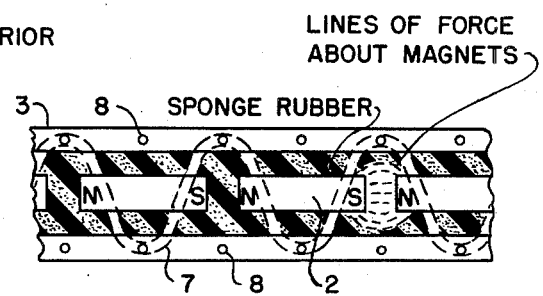
Figure 2 is a cross-sectional, elevational view of the geophone construction showing the placement of the permanent magnets within the geophone and the relation of the coiled conductors to the magnets.
Figure 3:
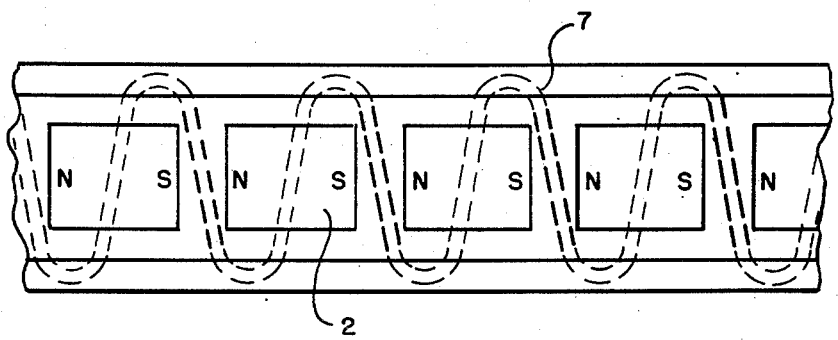
Figure 3 is a plan view corresponding to Figure 2 illustrating the flat or ribbon nature of the geophone; and finally

Wrapped around the elastically imbedded permanent magnets is a coil element 7. Coil 7 is continuously wrapped around the entire length of the cable so that starting at one end of the cable, the coil extends completely to the opposite end of the cable and is similarly returned along the cable. It is important that the spiral conductor 7 be so wrapped that it crosses each air gap between successive magnets in the same direction. Thus, as shown in Figure 2, the conductor 7 crosses each gap on the top side of the flat cable. The reason for this is evident from a study of Figure 2. With the conductor arranged as shown, i. e. crossing each gap at the top of the geophone, upward travel of the magnets causes more lines of force to be cut by the conductor and downward travel of the magnets causes less lines of force to be cut by the conductor. It should be evident that if one of the gap crossings is made at the bottom of the geophone rather than at the top, the signal generated by the upward travel of the magnets at that gap would be opposite in sense to the signal generated at the other gaps. For simplicity and clarity, the spiral conductor 7 is only illustrated as extending in one direction along the cable. The placement of the return spiral conductor is indicated by the numeral 8 in Figure 2, to show the orientation of the return spiral. So long as the conductor crosses each air gap in the same direction, any number of individual coils may be used about each magnet.

If desired, selected lengths of the single conductor may be provided with independent conductor take-offs so that a single length of geophone cable can be used to provide separate geophone channels. The take-off conductors may be arranged in the cable sheath, if desired, provided that the paired conductors be twisted and extend along the cable without spiraling about the magnetic elements of a different section of the cable.

After application of the spiral conductor as described, the final cable sheath may be applied so as to provide the integral geophone construction, resembling in appearance a deflated fire hose. It is convenient to paint one side of the flat geophone cable to permit convenient visual inspection of the cable in use to ensure arrangement of the magnetic elements in proper polarity. For most purposes in using this geophone, it is only necessary to unreel the geophone along the ground. In rough or irregular terrain, it may be desirable to employ a roller or the like to force the geophone into more intimate contact with the ground. The geophone may be connected to suitable recording channels of conventional seismic amplifying and recording apparatus. As indicated, each geophone cable may be used as an individual geophone array, or if desired, the cable can be divided into different sections.

For reasons of economy, it may be desirable to construct the geophone cable in short sections, each section containing, for example, some 25 to 50 individual magnets and having a length of say 2 to 4 feet, as illustrated in Figure 1. A desired number of these active sections would then be permanently interconnected with standard multi-conductor cable to form a geophone array for one station having a predetermined optimum overall length. For further economy and convenience in laying out, a desired number of stations can be mechanically formed into one long cable so that the entire spread of geophone stations for one shot point can be reeled out in one action. At one end of this long cable, a multiple contact connector is provided to connect the output of the various geophone arrays to the seismic amplifiers contained in the seismic truck 18 in the proper sequence and polarity. Figure 1 illustrates the arrangement of this nature, including exemplary spacing of the geophone elements.

It is common practice in many instancs to employ, for example, 24 individual geophones for each station and to record the outputs from as many as 24 stations simultaneously for each shot point. In this instance a total of 576 individual electrical connections are required in the process of laying out the detector spread. With the use of a reelable geophone cable constructed to contain 576 active sections, as described, only one connector need be handled.

What is claimed is:

1. A continuous flexible geophone arrangement comprising in combination: a laterally flattened cable sheath, a plurality of individual permanent magnets elastically suspended in the center of said sheath and spaced lengthwise of said sheath in a manner defining gaps between adjacent magnets, all of said magnets being oriented in the same direction lengthwise of said sheath, and a continuous spiral conductor passing around said permanent magnets along the length of the geophone arrangement in a manner such that the conductor crosses each of the gaps on the same flat sides of the sheath.

2. The geophone arrangement of claim 1 in which said permanent magnets comprise flat rectangular magnets.

3. The geophone arrangement defined by claim 1 in which the said elastic suspension is provided by sponge rubber.

4. The geophone arrangement defined by claim 1 in which the opposite sides of the said flattened sheath are differently colored.

5. A geophone arrangement comprising in combination: a plurality of active geophone sections connected with a plurality of inactive cable sections arranged in an integral cable, each of said active geophone sections comprising a laterally flattened cable sheath, a plurality of individual permanent magnets elastically suspended in the center of said sheath and spaced lengthwise of said sheath in a manner defining gaps between adjacent magnets, all of said magnets being oriented in the same direction lengthwise of said sheath, and a continuous spiral conductor passing around said permanent magnets along the length of the geophone arrangement in a manner such that the conductor crosses each of the gaps on the same flat side of the sheath, and conductors from each of said active sections extending through the inactive section of the cable terminating at one end of the cable.

References Cited in the file of this patent

UNITED STATES PATENTS

| | | |
|---|---|---|
| 1,470,733 | Hayes | Oct. 16, 1923 |
| 1,584,613 | Comstock et al. | May 11, 1926 |
| 2,325,199 | Woods | July 27, 1943 |
| 2,440,903 | Massa | May 4, 1948 |
| 2,649,579 | Alexander | Aug. 18, 1953 |